ENHANCEMENT-MODE MOS CIRCUITRY
Filed Oct. 6, 1967 3 Sheets-Sheet 1
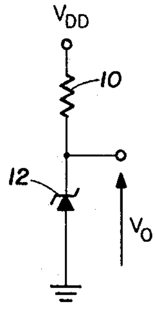
FIG. 1
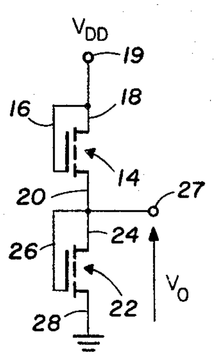
FIG. 2
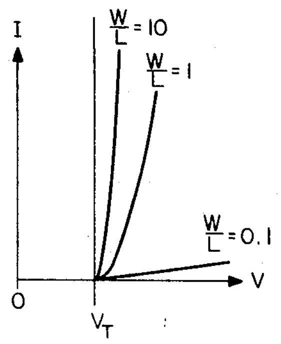
FIG. 3
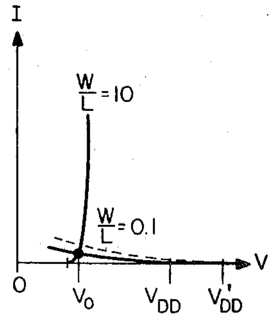
FIG. 4
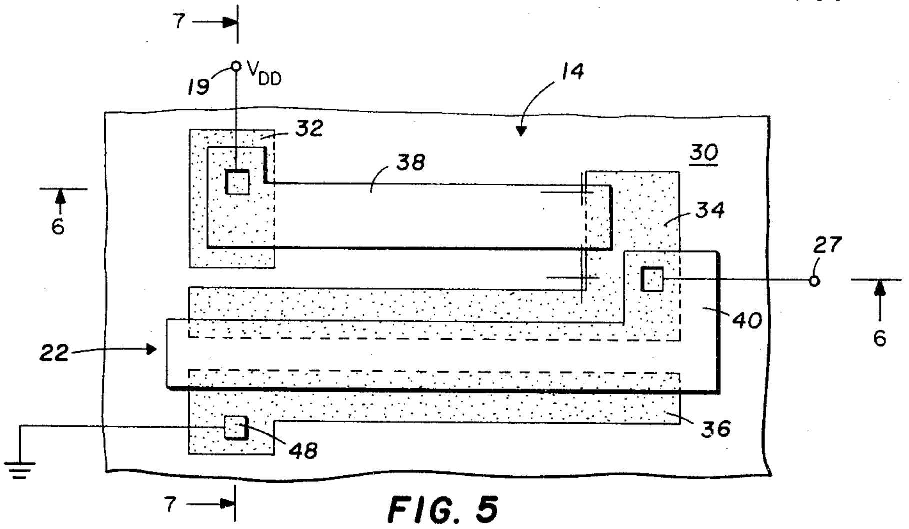
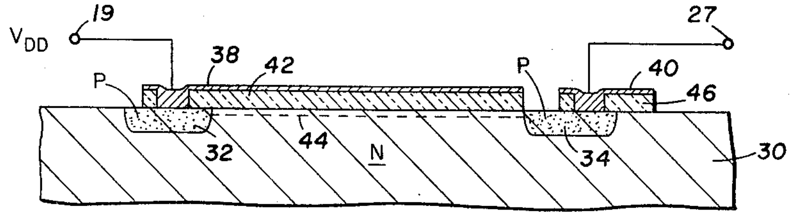
FIG. 6
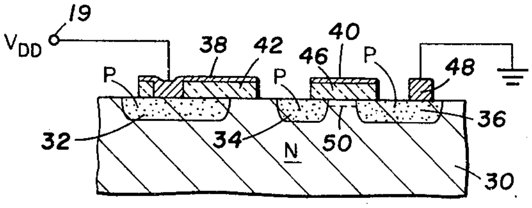
FIG. 7
INVENTOR
RAYMOND M. WARNER, JR.
E. Mickey Hubbard
ATTORNEY

United States Patent Office 3,508,084

Patented Apr. 21, 1970

3,508,084

ENHANCEMENT-MODE MOS CIRCUITRY

Raymond M. Warner, Jr., West Palm Beach, Fla., assignor to Texas Instruments Incorporated, Dallas, Tex., a corporation of Delaware

Filed Oct. 6, 1967, Ser. No. 673,328
Int. Cl. H03k *23/08*
U.S. Cl. 307—304 6 Claims

ABSTRACT OF THE DISCLOSURE

A pair of enhancement-mode metal-oxide-semiconductor field effect transistor devices connected in series and each having a control gate commonly connected to a drain. One of the field effect transistor devices has a width-to-length channel ratio substantially less than the width-to-length channel ratio of the other field effect transistor device to act as a load resistance. The other transistor exhibits conduction characteristics similar to the breakdown characteristics of a Zener diode, and the series connected transistors are utilized in a plurality of circuits for both voltage and current regulation, as well as for switching applications.

This invention relates to metal-oxide-semiconductor (MOS) field effect transistor (FET) devices, and more particularly to enhancement-mode MOS circuitry having sharply rising conduction characteristics.

A myriad of different circuits have heretofore been developed which utilize the sharp voltage breakdown of various types of diodes. In particular, the breakdown reverse-voltage characteristics of silicon diodes, often called the Zener voltage, has been advantageously utilized in many applications for voltage regulation and reference purposes.

The most common circuit configuration utilizing a Zener diode is a series connection of the diode with a resistance. As is widely known, the usefulness of the series connected resistor-Zener diode device stems primarily from the fact that the output voltage across the Zener diode remains very nearly constant in the face of relatively wide variations in the bias voltage applied to the resistor, as long as the applied bias voltage is greater than the Zener breakdown voltage. However, with the advent of miniaturization of electronic circuitry, especially MOS circuitry, the conventional Zener diodes have been found to be incompatible with respect to fabricational process.

Various types of FET devices have heretofore been developed for use in amplifier circuitry and in high frequency oscillators and the like. Disclosures of various applications of such FET devices may be found in U.S. Patent No. 3,135,926 to Bockemuehl and U.S. Patent No. 3,281,699 to Harwood. These FET devices may be formed in extremely small configurations, and have been found to provide many desirable electrical characteristics such as a very high input resistance, but have not heretofore been utilized to provide sharply rising conduction characteristics for voltage regulation and reference purposes.

In accordance with the present invention, a two-terminal field effect device comprises a channel having a drain end and a source end, with a control gate associated with the channel and directly coupled to the drain end. The channel is provided with a sufficiently high width-to-length ratio that the voltage appearing across the device will not vary substantially from the threshold voltage of the device upon the application of a varying load current to the device.

In accordance with another aspect of the invention, a pair of enhancement-mode metal-oxide-semiconductor field effect transistors each having a common drain and control gate are connected in series. The width-to-length ratio of one of the transistors is substantially greater than the width-to-length ratio of the other transistor in order o provide sharply rising conduction characteristics upon the application of a biasing voltage above the combined threshold voltages of the devices.

For a more complete understanding of the present invention and for further objects and advantages thereof, reference may now be had to the following description taken in conjunction with the accompanying drawings in which:

FIGURE 1 is a schematic diagram of the conventional series resistance-Zener diode configuration;

FIGURE 2 is a schematic diagram of the FET device constructed in accordance with the present invention;

FIGURE 3 is a graphical illustration of the output characteristics of FET devices having varying width-to-length channel ratios;

FIGURE 4 is a graphical representation or "load line" diagram of the output and load characteristics of the present FET device;

FIGURE 5 is a schematic plan view of one embodiment of the FET device shown in FIGURE 2;

FIGURE 6 is a schematic sectional view taken along section lines 6—6 of the FET device illustrated in FIGURE 5;

FIGURE 7 is a schematic sectional view of the device illustrated in FIGURE 5 taken generally along the section line 7—7;

Figures 8, 9:
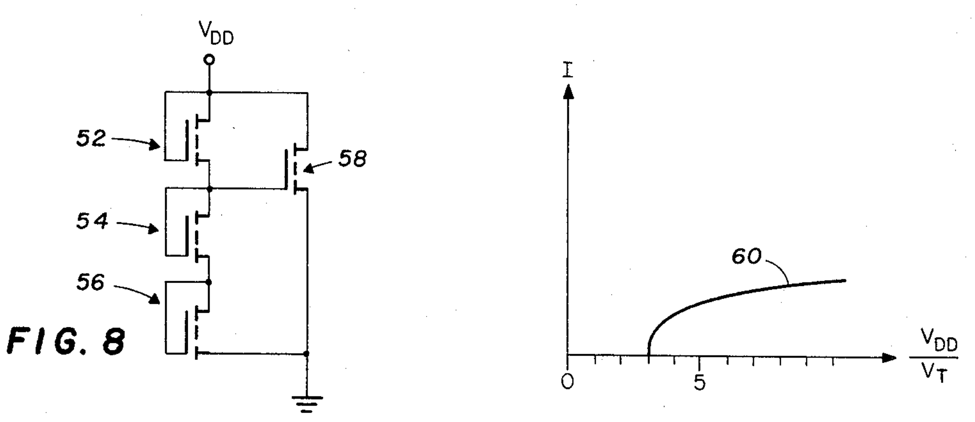
FIGURE 8 is a schematic view of a current limiting device according to the invention.
FIGURE 9 is a graphical representation of the I–V characteristics of the circuit illustrated in FIGURE 8.

Referring now to the drawings, FIGURE 1 illustrates the conventional combination of a load resistor 10 connected in series with a Zener diode 12. As is well known, the combination of the resistor 10 and the diode 12 is a useful building block for electronic circuitry due to the fact that the voltage $V_o$ across the diode 12 remains very nearly constant during relatively wide variations in the magnitude of the biasing voltage $V_{DD}$ applied to the terminals of the device, as long as the magnitude of the biasing voltage $V_{DD}$ is greater than the breakdown or Zener voltage of the diode 12. The characteristics of such a resistor-diode combination thus allows the device to be utilized for voltage regulation and the like.

FIGURE 2 illustrates circuitry according to the present invention which provides conduction characteristics approximating those of the resistor-diode combination of FIGURE 1. A first MOS FET14 has a control gate 16 and a drain 18 which are commonly connected at a terminal 19 to which a voltage supply $V_{DD}$ may be applied. Source 20 of the transistor 14 is connected in series with a second MOS FET22. The drain 24 and the control gate 26 of transistor 22 are commonly connected to the source 20 of transistor 14. The source 28 of transistor 22 serves as one terminal of the series connected circuit. Alternatively, both gates of the transistors could be connected to supply $V_{DD}$.

While in the broader aspects of the invention the transistors 14 and 22 may comprise various types of field-effect transistors exhibiting the desired characteristics, in the preferred embodiment of the invention the transistors comprise p-channel enhancement-mode MOS FET devices.

The operation of the device shown in FIGURE 2 may be partially explained by reference to FIGURES 3 and 4. When the conrtol gate and the drain in MOS FET devices are commonly connected to form one terminal while the source of the transistor forms a second terminal, the transistor operates in the saturation region and exhibits an I–V characteristic which is dependent upon the width-to-length ratio of the channel of the device.

FIGURE 3 illustrates the I–V characteristics of three MOS FET devices having an identical threshold voltage $V_T$, but with different width-to-length channel ratios. As may be readily observed from the graph, a FET device having a width-to-length channel ratio of 0.1 will not draw substantially greater current upon an increase in the applied voltage. Conversely, FET devices having higher orders of width-to-length channel ratios of 1 and 10 exhibit I–V characteristics fairly closely approxmiating the breakdown voltage characteristics of a Zener diode, as long as the applied voltage is greater than the threshold voltage of the FET devices. It is this phenomenon exhibited by FET devices having relatively high width-to-length channel ratios which the invention utilizes.

In the circuit shown in FIGURE 2, the transistor 14 serves as a load resistance for the transistor 22. In order to provide signal regulation with the device shown in FIGURE 2, the width-to-length channel ratio of the transistor 14 should be substantially less than the width-to-length channel ratio of transistor 22. FIGURE 4 illustrates approximate voltage regulation utilizing the configuration of FIGURE 2, wherein transistor 14 is provided with a width-to-length channel ratio of 0.1 and transistor 22 is provided with a width-to-length channel ratio of 10.

If the supply voltage $V_{DD}$ is greater than the threshold voltage of the combined transistors 14 and 22, an operating bias point will occur for the device at $V_o$. If the supply potential is increased to $V'_{DD}$, the load line will move to the position of the dotted line, but the operating voltage bias point will not be appreciably changed from $V_o$. This characteristic of a p-channel enhancement-mode MOS FET may thus be used in a variety of different applications to approximate a series resistor-Zener diode building block. The high input resistance of the MOS FET devices enables the present configuration to be utilized with control circuitry of extremely high resistance requiring low current, without adding an appreciable current increment to terminal I–V characteristics of the circuitry.

It will be understood that other load devices, such as diffused pure resistances or thin-film resistors, could be utilized with the present invention in place of the FET device disclosed as the load resistance.

The circuit shown in FIGURE 2 is particularly suitable for fabrication on a single substrate utilizing MOS transistors. A typical embodiment of the circuit illustrated in FIGURE 2 is illustrated somewhat schematically in FIGURES 5–7. The circuit may be fabricated by utilizing any suitable conventional technique presently used to fabricate MOS transistors. The circuit is constructed on an n-type substrate 30 having three relatively heavily doped p-type diffused regions 32, 34 and 36. The plan view of the diffused regions is illustrated in FIGURE 5. A metal control gate 38 bridges between the diffused region 38 and 34, while a metal control gate 40 bridges between the diffused area 34 and 36.

As best seen by reference to the cross-sectional view shown in FIGURE 6, the metal control gate 38 electrically contacts the diffused region 32 to form the commonly connected gate and drain of transistor 14, to which is connected terminal 19 for receiving a biasing voltage $V_{DD}$. An insulating layer 42 electrically insulates the metal control gate 38 from the n-substrate 30. When the device is properly biased, the potential on the control gate 38 bridging the diffused areas 32 and 34 will produce a p-type enhanced channel 44 with a length approximating the plan view dimension parallel to the direction of current between the diffused regions. Channel 44 can be seen to have a relatively small width and a relatively large length to provide a width-to-length ratio of about .01.

FIGURES 6 and 7 illustrate that the metal control gate 40 electrically contacts the diffused region 34 to form the source of transistor 14 and the commonly connected gate and drain of transistor 22. The output terminal 27 is connected to this common connection to provide a regulated voltage output when the device is properly biased. An insulating layer 46 of the same thickness as the insulating layer 42 insulates the metal layer 40 from the diffused region 36. A metal electrode 48 is directly connected to the diffused region 36 to serve as the source of transistor 22 which may be connected to ground. When the device is properly biased, a p-type enhanced channel 50 will be produced between the diffused regions 34 and 36. Inspection of FIGURE 5 and 7 will illustrate that the channel 50 has a relatively large width, or the plan view dimension normal to the direction of current flow, with a small length, or the plan view dimension parallel to the direction of current flow, to provide a width-to-length ratio of about 10. Transistor 22 thus has a higher transconductance than transistor 14.

The operation of circuit shown in FIGURES 5–7 conforms to the operation of the circuit shown in FIGURE 2 and illustrated by reference to the graph of FIGURE 4. In this example, the ratio of the respective width-to-length values of the load transistor 14 and the transistor 22 which exhibits the sharp conduction characteristics is 100, or 10 to 0.1. The higher the ratio between the width-to-length values of the two transistors, the better the regulation of the device. The preferred method of determining the relative values for the channel dimensions for convenient layout of the present circuit is to determine a desired ratio R of the relative width-to-length values of the two transistors. The width-to-length channel ratio of the load transistor 14 should then be $$\frac{1}{\sqrt{R}}$$

while the width-to-length channel ratio of the transistor 22 exhibiting sharp conduction characteristics should be $\sqrt{R}$.

The following drawings illustrate various circuits utilizing the I–V characteristics of the present invention. FIGURE 8 is a schematic drawing of a circuit which provides current limiting. Such a circuit is particularly useful as a load for MOS FET circuitry due to the limitation of speed in such circuits by capacitance. This limitation of speed is aggravated by the utilization of a conventional saturated load two terminal MOS FET because of the direction of current nonlinearity illustrated with reference to FIGURE 3. The circuit shown in FIGURE 8 allows the parasitic capacitance of MOS circuits to be charged much faster than circuitry heretofore utilized.

In the circuit shown in FIGURE 8, a p-channel enhancement-mode MOS transistor 52 is connected with a common control gate and drain to act as a resistive load for a pair of series connected MOS transistors 54 and 56. Transistors 54 and 56 are identical, and each has a common control gate and drain. The control gate of a MOS transistor 58 is connected between transistors 52 and 54, with the drain of transistor 58 being connected to a voltage supply $V_{DD}$ and the source connected to ground.

In this circuit, the width-to-length ratio of the transistor 52 must be substantially less than the width-to-length ratios of the identical transistors 54, 56 and 58. It is not necessary that transistors 54, 56 and 58 be extremely large, as long as they are relatively large compared to transistor 52. Consequently, a circuit constructed in accordance with FIGURE 8 could be realized on a common substrate in an area comparable to that of a conventional load for an MOS circuit.

FIGURE 9 illustrates the operation of the circuit of FIGURE 8. The combined threshold voltage of the series connected transistors 52, 54 and 56 is $3V_T$, ignoring the effect of back-gate bias which may produce an increase in the composite threshold voltage of the series connected devices. When the applied voltage increases to $3V_T$, the series connected transistors cause the transistor 58 to conduct. However, the control gate of the transistor 58 will be maintained approximately at a constant voltage of $2V_T$ because of the conduction characteristics of the series connected transistors 54 and 56. The control of the gate voltage of the transistor 58 produces a current limiting effect between the two terminals of the circuit illustrated by I–V characteristics of the curve 60.

Figures 10, 11, 12, 13, 14, 15:
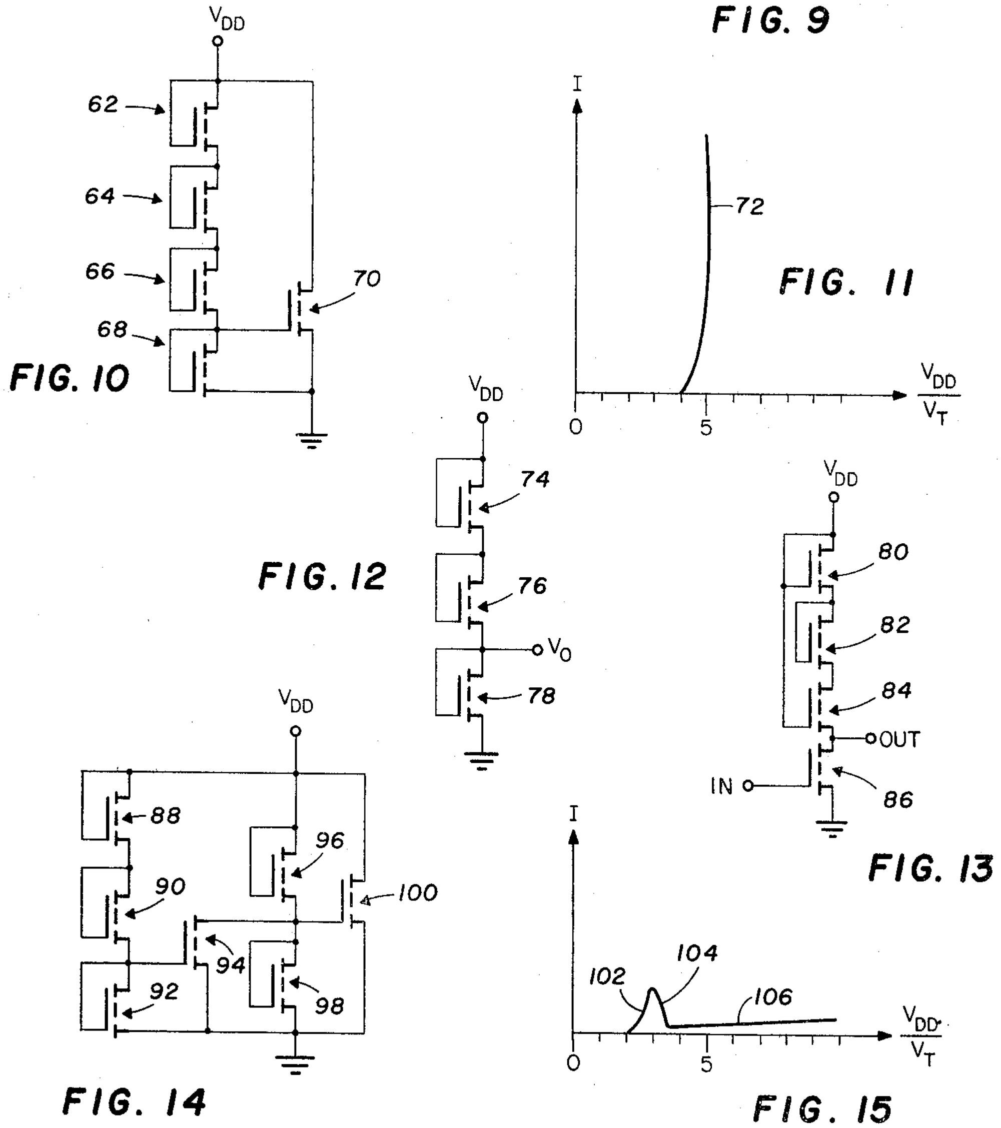
FIGURE 10 is a schematic of a voltage limiting device according to the present invention.
FIGURE 11 is a graphical representation of the output characteristics of the circuit illustrated in FIGURE 10.
FIGURE 12 is a schematic diagram of a voltage divider utilizing the principles of the present invention.
FIGURE 13 is a schematic diagram of a resistive load device utilizing the principles of the present invention.
FIGURE 14 is a schematic diagram of a bi-stable device constructed in accordance with the principles of the invention.
FIGURE 15 is a graphical representation of the voltage characteristics of the circuitry illustrated in FIGURE 14.

FIGURE 10 is a schematic diagram of a circuit illustrating how a protective voltage breakdown may be provided by the present invention at an arbitrary multiple of $V_T$. For instance, assuming that it is desirable to provide voltage regulation in a circuit at a voltage approximately equal to $4V_T$ of a particular field effect transistor, the circuit illustrated in FIGURE 10 would be constructed with four field effect transistors 62, 64, 66 and 68, each having a directly connected control gate and drain in accordance with the invention. The series connected transistors 62, 64 and 66 are identical and have substantially higher width-to-length ratios than the width-to-length ratio of transistor 68. A suitable embodiment of the circuit shown in FIGURE 10 would comprise a width-to-length ratio of 1 for each of the transistors 62, 64 and 66, with a width-to-length ratio of 0.1 for the transistor 68.

A field effect transistor 70 having a relatively high width-to-length ratio is connected at its control gate to the common gate and drain of the transistor 68. The drain of the transistor 70 is connected to a source of voltage $V_{DD}$, and the transistor 70 begins to conduct when the bias voltage $V_{DD}$ reaches an amplitude of $4V_T$. Due to the biasing arrangement on the gate of transistor 70 it provides a regulated voltage of approximately $4V_T$ across its terminals, as illustrated by the curve 72 in FIGURE 11. Of course, it will be understood that if a different magnitude of protective breakdown voltage is desired, a sufficient number of series connected field effect transistors would be provided across transistor 70 to provide the desired protective voltage.

FIGURE 12 illustrates a circuit according to the invention for providing voltage division in order to eliminate the requirement of a plurality of power supply voltages. The use of MOS FET devices in this circuit enables a voltage divider to be compactly packaged and inexpensively produced. A pair of identical FET devices are connected with common control gates and drains and are connected in series in accordance with the invention with a similarly connected load resistance field effect transistor 78. The width-to-length ratios of the transistors 74 and 76 are identical and are substantially higher than the width-to-length channel ratio of the transistor 78. For instance, a width-to-length ratio of 10 for each of the transistors 74 and 76 may be provided, along with a width-to-length channel ratio of 0.1 for the transistor 78. Due to the conduction characteristics of the transistors 74 and 76, a voltage $V_o$ appears across the load resistance transistor 78 which is equal to the applied voltage $V_{DD}-2V_T$. The voltage division provided by the present device could, of course, be varied by increasing the number of series connected field effect transistors.

In some applications of MOS FET circuitry, it is desired to return the control gate of a transistor to a higher voltage than the voltage supplied to the drain of the transisor, in order to make the transistor appear to be a more pure resistance load. FIGURE 13 illustrates a circuit utilizing the present invention to achieve this result. Field effect transistors 80 and 82 are connected with common control gates and drains according to the present invention. The control gate of the transistor 80 is connected to the control gate of a load field effect transistor 84, which has a lower width-to-length channel ratio than transistors 80 and 82. A field effect transistor 86 will thus see the load 84 as a more linear resistance, due to the fact that the control gate of the load transistor 84 is at a higher potential than the drain of the transistor. In an exemplary circuit, if a biasing voltage $V_{DD}$ of 30 volts is applied to the terminals of the circuit, the control gate of the transistor 84 is biased at 30 volts while the drain of the transistor 84 is biased at about 20 volts.

In addition to signal amplitude regulation, the present invention may be utilized in bistable and negative resistance circuitry. FIGURE 14 illustrates a schematic of a circuit which exhibits a voltage-controlled negative resistance. The resulting bistable property upon the application of a sufficient bias voltage, makes the circuit feasible as a memory cell or the like. A pair of field effect transistors 88 and 90, preferably p-channel enhancement-mode MOS devices, are connected in series with common control gates and drains according to the invention. A load resistance field effect transistor 92 has a much smaller width-to-length channel ratio than the transistors 88 and 90 and has a commonly connected control gate and drain which are directly connected to the control gate of a field effect transistor 94.

The source of the transistor 94 is returned to ground, while the drain on transistor 94 is connected between a series connected pair of field effect transistors 96 and 98. Transistors 96 and 98 are connected between the terminal adapted to receive bias voltage and the terminal connected to ground. The source of the transistor 96 and the drain and control gate of the transistor 98 are connected to the control gate of the output field effect transisor 100, which is connected across the terminals of the circuit.

The width-to-length channel ratios of transistors 88, 90 and 96 are generally equal and are substantially greater than the width-to-length channel ratios of the two transistors 92 and 98. An exemplary construction of the circuit would provide width-to-length channel ratios of 1 for transistors 88, 90 and 96, with a width-to-length channel ratio of 0.1 for transistors 92 and 98. The width-to-length channel ratios of the transistors 94 and 100 are considerably larger than any of the other transistors in the circuit, and may be of magnitudes of approximately 10.

The graph shown in FIGURE 15 illustrates the operation of the circuit of FIGURE 14, wherein upon the application of a biasing voltage $V_{DD}$ of a magnitude of $2V_T$, the transistors 96 and 98 begin conduction and turn on the transistor 100. The voltage across the terminals of the device will thus rise, as illustrated by the portion 102 of the curve in FIGURE 15, to a point where the biasing voltage $V_{DD}$ is equal to $3V_T$. The normally nonconductive transistors 88, 90 and 93 become conductive when the applied voltage $V_{DD}$ equals $3V_T$, in order to turn on the normally non-conductive transistor 94. The conduction of the transistor 94 effectively shunts the control gate of the transistor 100 to ground, thus pulling the transistor 100 back into nonconduction, as shown on the graph by curve portions 104 and 106. The circuit shown in FIGURE 14 thus provides a bistable operation upon the application of a sufficient biasing voltage across the terminals of the device.

Figure 16:
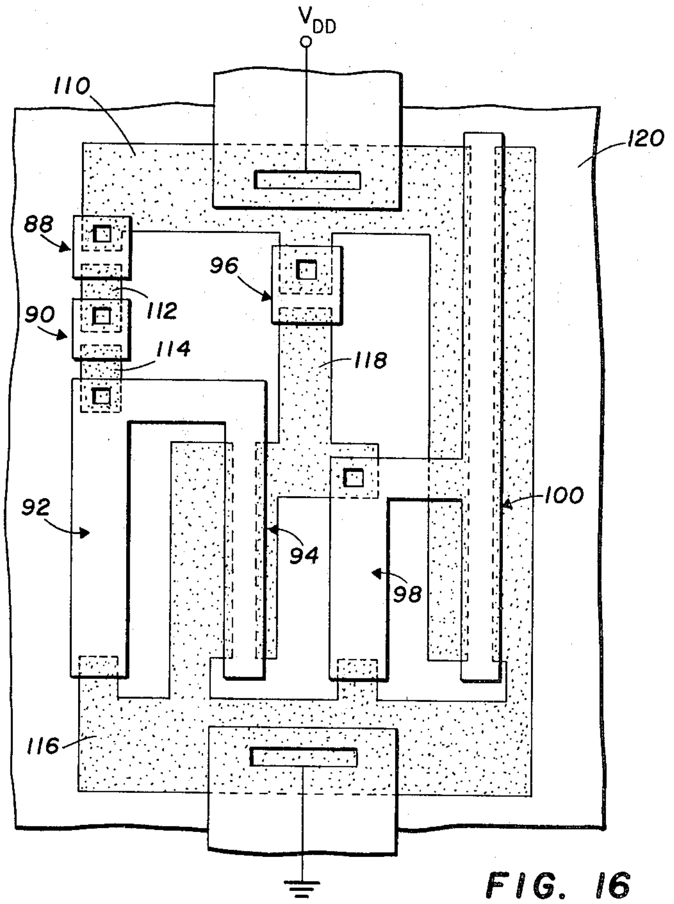
FIGURE 16 is a schematic plan view of one embodiment of a device constructed in accordance with the circuit shown in FIGURE 14.

The circuit shown schematically in FIGURE 14 may be advantageously constructed on a single semiconductor crystal by the use of present fabrication techniques of enhancement-mode MOS FET devices. An embodiment of such a circuit is shown in FIGURE 16. The circuit is achieved by heavily doped p-type diffused regions 110, 112, 114, 116, and 118 formed in an n-type substrate 120. A metal gate electrode bridges the diffused regions 110 and 112 to form the transistor 88, while a similarly constructed gate electrode bridges the diffused regions 112 and 114 to form the transistor 90.

A common gate electrode bridges the diffused regions 114 and 116 and the diffused regions 116 and 118, respectively, to form the transistors 92 and 94. A gate electrode bridges the diffused regions 110 and 118 to form the transistor 96, while common gate electrodes bridge the diffused regions 118 and 116 and diffused regions 110 and 116, respectively, to form the transistors 98 and 100. A metal layer connects the diffused region 110 with a supply of bias voltage $V_{DD}$, while a metal layer contacts the diffused region 116 to form a second terminal which is connected to ground.

An inspection of the circuit shown in FIGURE 16 will illustrate that the channels of transistors 88, 90 and 96 have generally the same width-to-length channel ratio. The channels of the transistors 92 and 98 have generally equal width-to-length ratios. The width-to-length channel ratios of the transistors 94 and 100 are much higher than the ratios of the other transistors in the circuit.

Figure 17:
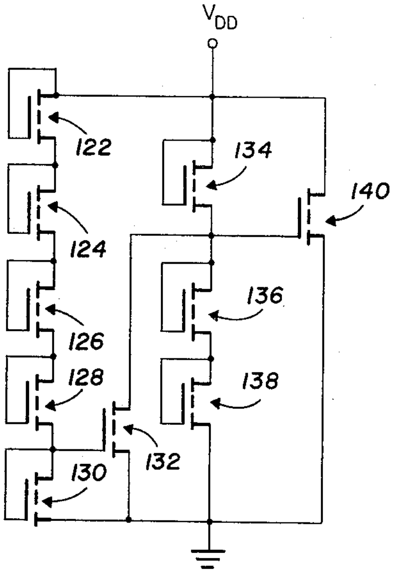
FIGURE 17 is a schematic diagram of a relatively high power voltage regulator constructed in accordance with the invention.

FIGURE 17 illustrates a variation of the circuit shown in FIGURE 14, wherein a relatively high current signal may be regulated with enhancement-mode MOS FET devices 122, 124, 126 and 128, each having common control gates and drains and connected in series with a load resistance field effect transistor 130. The common control gate and drain of the transistor 130 are directly connected to the control gate of a field effect transistor 132. The circuit thus described provides a voltage limiting effect somewhat similar to the circuit shown in FIGURE 10.

The drain of the transistor 132 is connected to the source transistor 134 which has a control gate and drain commonly connected to a source of bias potential $V_{DD}$. The drain of the transistor 132 is also connected to the commonly connected control gate and drain of a field effect transistor 136, which is in turn series connected to a similar transistor 138. The three transistors 134, 136 and 138 control the operation of the control gate of a relatively large field effect transistor 140 which is connected across the source of bias voltage $V_{DD}$ and ground. This latter portion of the circuitry provides a current limiting function very similar to the circuit described in conjunction with FIGURE 8.

Figure 18:
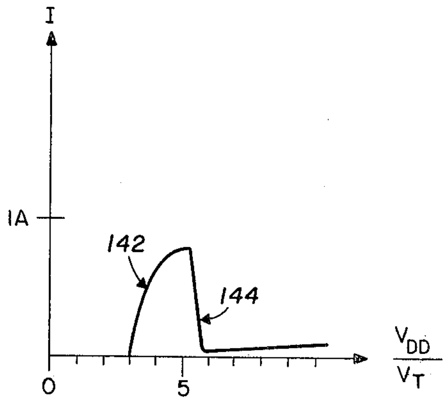
FIGURE 18 is a graphical representation of the voltage characteristics of the circuit illustrated in FIGURE 17.

The combination of the voltage and current limiting characteristics of these circuits combines to provide an operation illustrated in the graph in FIGURE 18. Upon the application of a bias voltage of approximately $3V_T$, which is the combined threshold voltage of the three series connected transistors 134, 136 and 138, the transistor 140 is caused to conduct. This conduction is shown by the curve 142 of the graph in FIGURE 18. When the applied bias voltage reaches approximately $5V_T$, which is the combined threshold voltage of the series connected transistors 122–130, the normally non-conductive transistor 132 will be turned on. This conduction of transistor 132 tends to shunt the control gate of the transisor 140 to ground and cause a diminishing of conduction, as illustrated by the curve 144 of the graph in FIGURE 18.

The width-to-length channel ratios of transistors 122, 124, 126, 128, 136 and 138 are equal, and may be on the order of 1. The width-to-length channel ratios of the field effect transistors 130 and 134 are equal to approximately 0.1. The width-to-length channel ratio of the transistor 132 is considerably higher, and may have a value of approximately 100. The width-to-length channel ratio of the power transistor 140 must be extremely high, and may be on the order of 6,000.

The circuit as shown in FIGURE 17 may be advantageously employed as an automotive voltage regulator placed in series with the field winding of an alternator and in parallel with the battery of the automobile. When the battery of the automobile is fully charged, the present circuit would begin to diminish the flow of current to the field winding of the alternator, thus essentially cutting off the output of the alternator. Since the device shown in FIGURE 17 is a two terminal device, it could be very inexpensively packaged as a small diode which might be pressed into the end of an alternator in the manner of a conventional automobile rectifier. By the use of the invention, the presently required wire, harness and resulting mounting labor for installation of conventional automobile voltage regulators could be eliminated, with no reduction in circuit performance.

The present invention thus provides a MOS FET building block with I–V characteristics very closely approximating those of a series connected resistor and a Zener diode. Such a circuit has distinct advantages over the conventional bulky resistor-diode combination, and will thus find many applications in circuitry with resulting savings in space and operating voltage requirements.

Although the preferred embodiments of the invention have been described in detail, it is to be understood that various changes and modifications may be made therein by one skilled in the art without departing from the spirit and scope of the invention.

What is claimed is:

1. A field effect circuit comprising:

a first enhancement-mode metal-oxide semiconductor having a channel with a drain end and a source end, a control gate associated with said channel and coupled to said drain end, said channel having a relatively high width-to-length ratio so that voltage impressed across said device will not vary substantially from the threshold voltage of said device upon the application of varying current to said device, a load resistance means connected to said drain end and said control gate, said resistance means comprising a second enhancement-mode metal-oxide semiconductor having a second channel with a drain and a source end and a control gate associated with said second channel, and the width-to-length ratio of said channel being at least 10 times larger than the width-to-length ratio of said second channel.

2. The device of claim 1 wherein the length-to-width ratio of said channel is equal to the square root of the ratio of the width-to-length ratio of both of said channels.

3. The device of claim 1 wherein the width-to-length ratio of said second channel is the reciprocal of the width-to-length ratio of said channel.

4. In a field effect circuit, the combination comprising:

(a) at least one enhancement-mode metal-oxide-semiconductor device having a common drain and control gate to provide sharply rising current voltage characteristics, (b) load resistance means connected in series with said metal-oxide-semiconductor device and adapted to be driven by a biasing voltage, said load resistance means comprising a field effect transistor having a common gate and drain and a width-to-length channel ratio substantially less than that of said metal-oxide-semiconductor device, and (c) output means coupled to said load resistance means and said metal-oxide-semiconductor device for providing an output signal tending to be limited in amplitude by the current voltage characteristics of said metal-oxide-semiconductor device.

5. In a field effect circuit, the combination comprising:

(a) at least one enhancement-mode metal-oxide-semiconductor device having a common drain and control gate to provide sharply rising current voltage characteristics, (b) load resistance means connected in series with said metal-oxide-semiconductor device and adapted to be driven by a biasing voltage, (c) output means coupled to said load resistance means and said metal-oxide-semiconductor device for providing an output signal tending to be limited in amplitude by the current voltage characteristics of said metal-oxide-semiconductor device, (d) normally non-conductive means connected to said output means and operable in dependency on a first level of applied voltage to become conductive, (e) said metal-oxide-semiconductor device operable in dependency on a second level of applied voltage to become conductive, and (f) load means connected to said normally non-conductive means for being driven into and out of conduction upon the application of voltage having said first level.

6. The combination of claim 5 wherein each of said means comprises at least one enhancement mode metal-oxide-semiconductor device and are each formed on the same semiconductor crystal.

References Cited

UNITED STATES PATENTS

| | | | |
|---|---|---|---|
| 3,289,093 | 11/1966 | Wanlass | 317—235 |
| 3,365,707 | 1/1968 | Mayhew | 317—235 |
| 3,406,298 | 10/1968 | Axelrod | 317—235 |
| 3,390,382 | 6/1968 | Igarashi | 317—235 |
| 3,395,290 | 7/1968 | Favina et al. | 317—235 |

OTHER REFERENCES

IBM Tech. Discl. Bul., "Field Effect Transistor Circuits," by Atwood, vol., No. 9, February 1964, pages 91, 92, 93.

JERRY D. CRAIG, Primary Examiner

U.S. Cl. X.R.

317—235